ABSTRACT OF THE DISCLOSURE

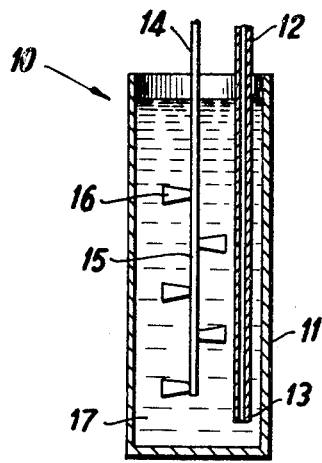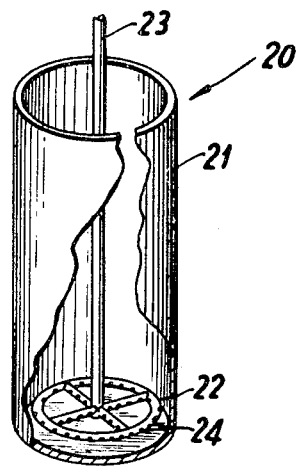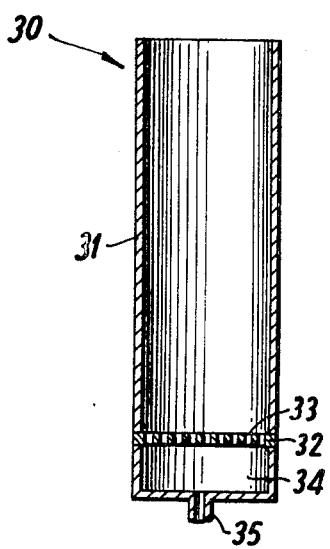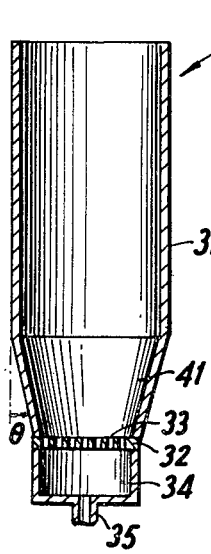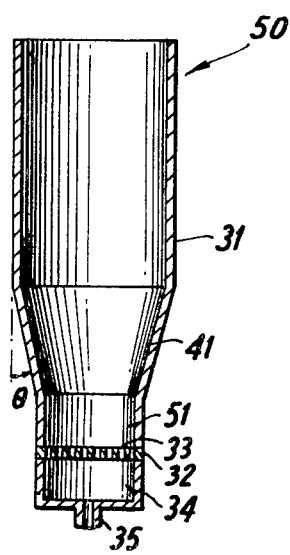

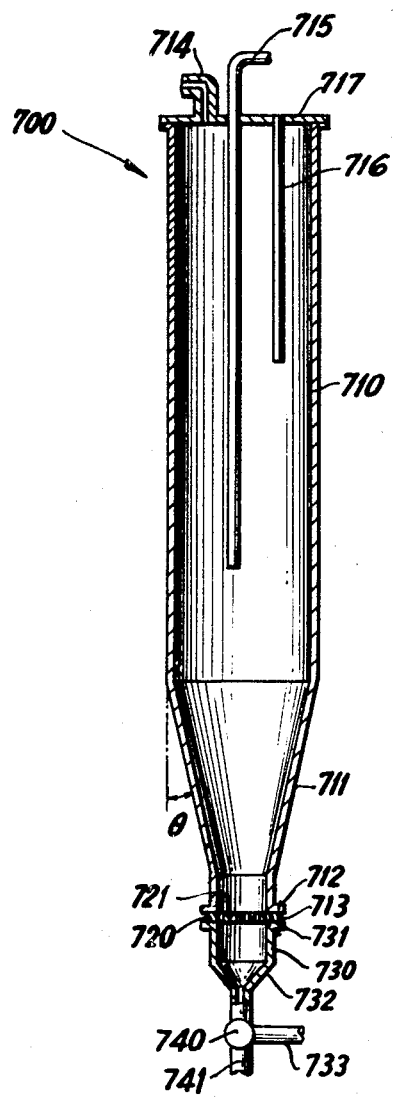
FIG. 7
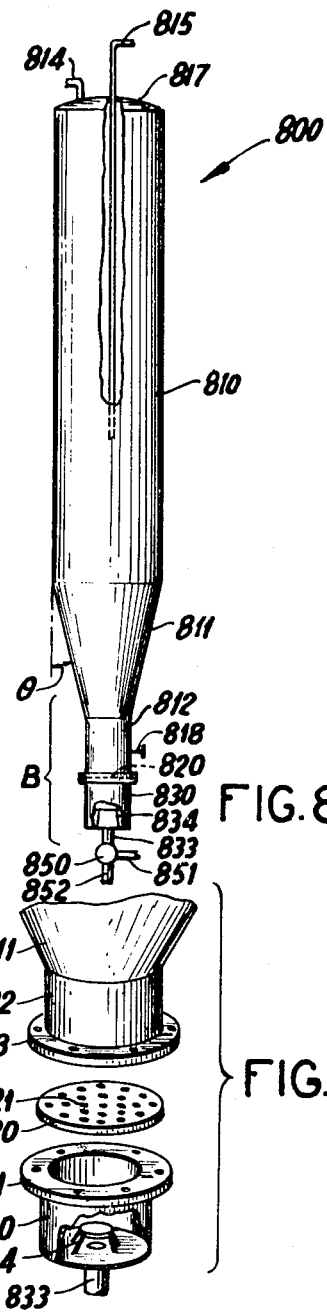
FIG. 8A
FIG. 8B
INVENTORS
KEIZO IWASE
TOSHIO TAKADA
MASAO KIYAMA
BY *Sandoe Hopgood & Calimafde*
ATTORNEYS 3,743,707
METHOD FOR PRODUCING IRON CONTAINING MATERIALS, INCLUDING FERRITES AND OXY-HYDRATES
Keizo Iwase, Toshio Takada, and Masao Kiyama, Kyoto, Japan, assignors to Nippon Electric Company, Limited, Minato-ku, Tokyo, Japan
Original application Apr. 1, 1968, Ser. No. 742,105, now abandoned. Divided and this application Jan. 28, 1971, Ser. No. 110,408
Claims priority, application Japan, Apr. 1, 1967, 42/20,620
Int. Cl. C01g 49/02, 49/06, 49/00
U.S. Cl. 423—594   6 Claims

A method is provided for the effervescent mixing and oxidation of aqueous solutions containing a suspension of iron-containing particles capable of dissolving to form hydroxoferrous complex ions. In the method, a column of aqueous solution is established in an elongated vessel containing a suspension of iron-containing particles while maintaining a flow of oxidizing gas from said gas chamber through said multi-perforated plate to effect uniform mixing of the oxidizing gas and the solution, the flow of gas being maintained to produce a precipitate comprised of ferric ions.

---

This application is a division of co-pending application Ser. No. 742,105, filed April 1, 1968 and now abandoned.

This invention relates to a method for the effervescent mixing and oxidizing of aqueous solutions containing a suspension of iron-containing particles capable of dissolving to form hydroxoferrous complex ions.

The objects of the invention will be apparent from the following disclosure and the accompanying drawings wherein:

FIG. 1 is a diagrammatic cross sectional view of a conventional stirring and oxidizing device for solutions;

FIG. 2 is a perspective view of another conventional device having the similar function with a part thereof cut away;

FIG. 3 is a diagrammatic cross sectional view of a most basic embodiment of the device according to this invention;

FIG. 4 is a diagrammatic cross sectional view of a similar device as a modification of the one shown in FIG. 3;

FIG. 5 is a diagrammatic cross sectional view of a similar device as another modification of the device shown in FIG. 3;

FIG. 7 is a diagrammatic cross sectional view of a similar device as still another embodiment of this invention;

FIG. 8A is a diagrammatic cross sectional view of a further embodiment of this invention; and FIG. 8B is an exploded view of the essential portion B of the device 800 shown in FIG. 8A with a part thereof cut away.

DETAILED DESCRIPTION OF THE INVENTION

Figure 6A:
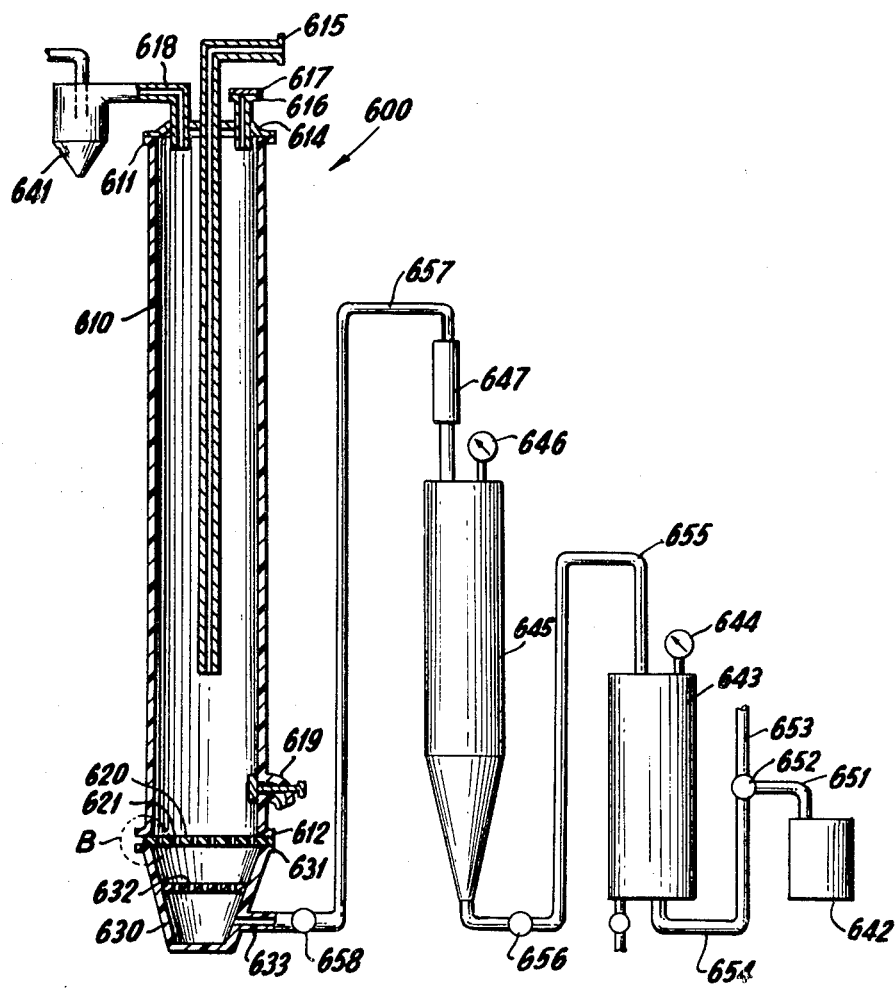
FIG. 6A is a diagrammatic representation in cross section of an embodiment of practical equipment for effervescent mixing and oxidizing of solutions according to this invention.

The present invention relates generally to a method for performing simultaneously stirring and oxidizing of solutions, and more particularly to a method for effervescent mixing and oxidizing of aqueous solutions containing particles, in particular, which can dissolve themselves to form hydroxoferrous complex ions thereinto for the manufacture of a precipitate of particles containing ferric ions ($Fe^{3+}$) as a suitable raw material for magnetic memory elements, ferrites or pigments.

Among known kinds of precipitated particles containing $Fe^{3+}$ available by oxidation of solutions containing particles which can dissolve to form hydroxoferrous complex ions thereinto are the following:

Ferric oxyhydrates ($\alpha$—FeOOH and $\gamma$—FeOOH), spinel type ferrosic oxide ($Fe_3O_4$), $\gamma$-type ferric oxide ($\gamma$—$Fe_2O_3$), $\alpha$-type ferric oxide ($\alpha$—$Fe_2O_3$), spinel type ferrite ($M^{2+}OFe_2O_3$) (M denotes metal ion other than iron ion), etc. Precipitated particles of such kinds have been known to have a wide field of applications as raw materials for magnetic memory elements, ferrite cores, or pigments.

Several methods for the manufacture of precipitated particles of these kinds have been proposed: According to a first method, as disclosed in Japanese Patents Nos. 288,130, 299,548 and 300,838, fine iron particles are added to an acidic solution and the suspension thus obtained is subjected to oxidation to cause precipitation of ferric oxyhydrate $\alpha$—FeOOH or $\gamma$—FeOOH. According to a second method, a solution containing precipitated particles of ferrous hydroxide $Fe(OH)_2$ which was obtained by adding an alkaline substance to a ferrous salt solution is subjected to oxidation to cause precipitation of $\alpha$—FeOOH, $\alpha$—$Fe_2O_3$, $\gamma$—$Fe_2O_3$, or $Fe_3O_4$. A third method consists in oxidizing a solution containing ferrous hydroxide $Fe(OH)_2$ of $CdI_2$ type crystal structure and divalent-metal hydroxide $M(OH)_2$ and $Fe_{1-x}M_x(OH)_2$ having also $CdI_2$ structure obtained by adding an alkali to a solution containing the ferrous ion $Fe^{2+}$ and the divalent metal (other than iron) ion $M^{2+}$, as disclosed in Japanese patent application No. 50,616/1962 (corresponds to copending U.S. patent application Ser. No. 528,747, filed Feb. 21, 1966) entitled "Manufacturing Method for Spinel Type Ferromagnetic Oxide Precipitates by the Wet Method," thereby to cause precipitation of spinel type ferrite $M^{2+}OFe_2O_3$.

In spite of seeming differences, the three methods are in common in the following respects:

(1) Oxidation of a solution is mainly carried out by delivering an oxidizing gas into the solution.

(2) Fine particles of metallic iron or precipitated particles of a hydroxide containing $Fe^{2+}$ and having the $CdI_2$ type or $CdCl_2$ type crystal structure such as $Fe(OH)_2$, $M(OH)_2$ and so-called "green rust"

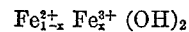
$Fe^{2+}_{1-x} Fe^{3+}_{x} (OH)_2$ (hydroxides of this kind will be abbreviated hereinafter simply as $Fe(OH)_2$ or $M(OH)_2$) contained in a solution can be dissolved into the solution to form the hydroxoferrous complex ions.

(3) The hydroxoferrous complex ions dissolved in the solution in equilibrium with fine particles of metallic iron or precipitated particles of $Fe(OH)_2$ and/or $M(OH)_2$ react with oxygen also dissolved in the solution to form a precipitate of particles containing $Fe^{3+}$.

(4) The speed with which fine iron particles or $Fe(OH)_2$ and/or $M(OH)_2$ particles and an oxidizing gas dissolve into the solution becomes the predominant factor for determining the speed of the overall chemical reaction and affects the growth of precipitated particles containing $Fe^{3+}$.

(5) The chemical composition and the crystal structure of the precipitated particles containing $Fe^{3+}$ are determined by the composition of the solution and the conditions of the oxidation process.

(6) The indispensable requirement common to those methods is to perform uniform oxidation of solutions to cause precipitation of uniform particles having the desired chemical composition and crystal structure. To this end, an oxidizing gas must be delivered uniformly into the solution in which fine iron particles or $Fe(OH)_2$ and/or $M(OH)_2$ particles, are uniformly in suspension with the solution kept stirred up vigorously.

Conventional devices for these methods usually consisted of a solution-containing vessel, an oxidizing gas pipe one end of which opens in the solution at or near the base of the vessel, and a stirrer as a utensil appended to the device as required.

Difficulties have been encountered with such devices in performing uniform stirring of a solution and uniform aeration with an oxidizing gas throughout the entire solution. In other words, it was almost impossible to oxidize suspended particles in the solution uniformly and to cause precipitation of particles containing $Fe^{3+}$ of the desired kind and size.

Accordingly it is an object of the present invention to provide a new and improved method capable of providing uniform effervescent mixing and oxidizing of solutions by use of an oxidizing gas.

It is another object of this invention to provide such a method and a device adapted for quantity production of a precipitate of desired particles containing $Fe^{3+}$ by causing an oxidizing gas to effervesce uniformly into a solution for oxidation thereof, in which particles capable of dissolving hydroxoferrous complex ions thereinto are in suspension.

Among constructional features of the device according to this invention are the following:

Provision of a plate with uniformly distributed perforations at the base of the vessel and of a gas chamber beneath the multi-perforated plate. This construction permits uniform liberation of an oxidizing gas into the solution in the vessel through the perforations and hence, uniform effervescence and oxidation of the solution. Incidentally, since the solution is in gravitational equilibrium with the oxidizing gas at small perforations in the plate, the tendency of the solution flowing or splashing out of the vessel can be prevented.

To further an understanding of the above-mentioned and other principles and features of this invention, a detailed description will be given in conjunction with the accompanying drawings.

A conventional similar device 10 with a most simple construction for stirring and oxidizing of solutions is composed, as shown in FIG. 1, of vessel 11, air delivery pipe 12, and stirrer 14. Operation of this device is as follows: The solution 17 filled in the vessel 11 is kept stirred up mechanically with vanes 16 installed on the rotatable shaft 15 of the stirrer 14 and air is delivered into the solution through the air delivery pipe 12 from its bottom end 13 for oxidation of the solution.

Another conventional, similar device 20 consists, as shown in FIG. 2, of vessel 21 and air delivery pipe 23 provided with aerator 22 at its base. With the vessel filled with a solution to react with an oxidizing gas, air is delivered into the pipe 23 so that air may rise in bubbles in the liquid from many perforations 24 provided in the aerator 22.

Such conventional devices succeeded in stirring up solutions, but not in uniformly suspending all or the iron powder or hydroxide particles therein, because some of the particles sedimentate at the bottom of the vessel. Among other drawbacks of such conventional devices are inability of air liberation at a position extremely close to the bottom surface of the vessel and ununiformly distributed perforations over the sectional area of the vessel, both of which tended to cause uniform oxidation of solutions. As a matter of fact, particles differing in chemical composition, crystal structure, and in diameter usually intermingled in the precipitate obtained with a conventional device and it was almost impossible to control the forming rate, the chemical composition, the crystal structure, and the particle size of the particles containing $Fe^{3+}$ to be precipitated.

Referring to FIG. 3, it will be seen that the device 30 according to this invention is basically composed of cylindrical vessel 31, uniformly multi-perforated plate 33 located beneath the vessel, and gas chamber 34 located beneath the multi-perforated plate. The solution is filled in the vessel 31 and an oxidizing gas such as air is delivered into the chamber 34 from the gas inlet 35. Since small perforations 32 are provided in the plate 33 uniformly, the oxidizing gas rises in bubbles at all times uniformly in the solution with respect to its cross sectional area. This is to say that the solution is subjected to uniform effervescence by an oxidizing gas rising into the solution and oxygen contained in the gas can oxidize the solution uniformly. In addition, with such a device, it is possible to cause even iron powder to suspend uniformly in the solution by suitably controlling the amount of gas flow liberated into the solution. The gas chamber 34 contributes to distributing the gas evenly to all perforations 32.

In cases where the degree of effervescence need not be vehement or the amount of solution to be oxidized at one time need to be increased, it is recommended that a constructional modification as shown in FIG. 4 having inverted cone frustum section 41 between the cylindrical vessel 31 and the multi-perforated plate 33 be adopted to make the cross sectional area of the vessel 31 larger than that of the plate 33. Constructional difficulties can well be anticipated in practice to locate the multi-perforated plate 33 directly at the base of such an inverted cone frustum 41. To obviate the disadvantages, it is advisable that a cylindrical coupler or neck 51 be connected between the inverted cone frustum 41 and the multi-perforated plate 33 in a manner as illustrated in FIG. 5. From the significance of the installation, the neck portion 51 may be very short; it may be much shorter than the height of the main cylindrical vessel 31. Both structures 40 and 50 in FIGS. 4 and 5 should make no difference from 30 in FIG. 3 in securing uniform effervescence of an oxidizing gas. Therefore the effect of this invention should in no way be impaired.

Now, each of the parts of the reaction vessel 31, 41, 51 and the perforated plate 33 of the devices 30, 40 and 50 should be made of a material capable of withstanding an appreciately high temperature (less than 100° C.) in the oxidation of the solution and a pH value of more than 2 of a solution to react with the oxidizing gas.

Among materials to meet these requirements are stainless steels and various kinds of synthetic resins such as hard vinyl chloride, polytetrafluoroethylene, polyfluorochloroethylene, polyfluorovinyliden, and epoxy resins. Incidentally, when economy is of prime consideration, materials such as iron or other metal sheet lined with glass, synthetic resins, or other suitable material would be preferred. These materials themselves have no direct bearing on the essence of this invention; one can choose any suitable material to meet above-mentioned requirements. The thickness of the multi-perforated plate 33 should be designed so as to safely withstand the weight of the solution.

Our experimental result has verified that the optimum thicknesses range generally between 1.0 mm. and 10.0 mm. and notably 1.0–3.0 mm. for stainless steel and 3.0–10.0 mm. for hard vinyl chloride. Diameter of holes 32 in multi-perforated plates 33 should be in such a range that the rising gas may be in equilibrium with the solution at the perforations.

The optimum diameters have been found to be in the range 1.0–6.0 mm., preferably 2.0–5.0 mm. Our experimental result demonstrates that liberation of an oxidizing gas into the solution becomes ununiform for diameters less than 1 mm., whereas the intrusion of the solution into the gas chamber 34 may occur when the oxidizing gas is rising into the solution for diameters larger than 6 mm., because the size of air inlet 35 is subject to a limitation. It has also been confirmed that the small perforations 32 is favorable to be uniformly distributed over the effective surface of the plate with a uniform interval ranging 0.5–5.0 cm., preferably 1.0–3.0 cm. The area of the plate 32 must be decided, as will be mentioned afterwards, in relation to the cross sectional area of the reaction vessel.

Generally speaking, the larger the height of reaction vessel 31 or that of the solution above the multi-perforated plate 33, the more advantageous becomes operation of the device for the following reasons:

First, the quantity of a solution that can be oxidized for the same gas amount is increased, which is obviously economically advantageous. Second, the tendency of the pressure applied on the plate 33 becoming uneven can be relieved even if the surface of a solution or the plate is inclined slightly to the ground surface, with the result that the unevenness of effervescence of an oxidizing gas with respect to the cross sectional area of the solution can be lessened. It has been found by our experiment that the height of the solution should preferably be more than 5 times the maximum diameter of the multi-perforated plate 33.

Any suitable geometrical shape may be adopted for cross-section of the reaction vessel 31 such as circular or square, provided that the cross sections of vessel 31, inverted cone frustum section 41, and neck section 51 be mutually similar in geometry.

It should be noted here that the optimum constructional requirements for any one of the devices 30, 40, and 50 for effervescent mixing and oxidizing of solutions shown in FIGS. 3, 4, and 5 are somewhat different depending on the kind of solution, particularly the kind of particles in suspension from which hydroxoferrous complex ions are to be dissolved.

For instance, in case the previously mentioned first method is adopted for the manufacture of precipitated particles containing the $Fe^{3+}$—that is, when the suspended particles from which the hydroxoferrous complex ions are to be dissolved are fine iron particles—the gravity of the suspended particles (iron particles) is considerably large, with the result that the solution must be subjected to the vehement effervescent action by the oxidizing gas. For this purpose, the ratio of the vessel cross sectional area to the perforated plate surface area must be selected at a value ranging from 1 to 36 (i.e., from 1 to 6 in terms of the diameter ratio in case the cross section of vessel is circular), the optimum ratio being from 1 to 4.

When this ratio exceeds unity—that is, when the tapered section 41 is provided—a small tapered angle $\theta$, favorably 0°–15°, must be selected in order to avoid the tendency of suspended fine iron particles in the solution becoming ununiform. According to our experiment, fine iron particles could be suspended in the solution in a manner sufficient for uniform oxidation, provided the amount of liberation of the oxidizing gas into the solution exceeds 0.2 liter per minute per unit area. Incidentally, since the solution in this case is acid, each of the vessel sections 31, 41 and 51 and the multi-perforated plate 33 must be made of an acid-resistant material capable of withstanding a temperature lower than 100° C.

In carrying out the previously mentioned second or third method, it must be noted that particles from which hydroxo ferrous complex ions are to be dissolved into the solution are a precipitate of hydroxides $Fe(OH)_2$ and/or $M(OH)_2$ being lighter than iron powder. Therefore, these particles can be uniformly suspended in the solution simply by subjecting the solution to uniform effervescent mixing. In view of economy, therefore, it is recommended that the ratio of the cross sectional area of vessel 31 to the surface area of multi-perforated plate 33 be made an appreciably large value, say, between 1 and 400, preferably between 36 and 64—these values are equivalent respectively to 1–20 and 6–8 in terms of the diameter ratio in case the cross section of vessel is circular. Thus, the tapered angle $\theta$ of the section 41 can be made considerably large, say, from 0° to 25°, most suitable values ranging between 10° and 25°. Since the solution is alkaline in this case, each of the previously mentioned parts need to be made of an alkali-resistant material capable of withstanding a temperature lower than 100° C.

Now the present invention will be described more in detail with reference to several embodiments taken in conjunction with the accompanying drawings.

Embodiment 1

Figure 6B:
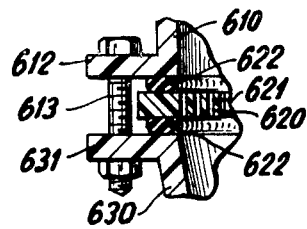
FIG. 6B is an enlarged cross sectional view of the part B (surrounded by the dashed circle) of the device 600 shown in FIG. 6A.

Referring to FIG. 6A, it will be seen that the device 600 according to the embodiment consists mainly of the following:

Cylindrical vessel 610 made of hard vinyl chloride, 2 cm. in wall thickness, 30 cm. in internal diameter, and 200 cm. in height and provided with upper and lower flanges 611 and 612; multi-perforated plate 620, 3 mm. in thickness, also made of hard vinyl chloride and having uniformly distributed small holes 621, 3 mm. in diameter and 2 cm. on centers, penetrating through the effective surface of the plate; air chamber 630, a hollow inverted cone frustum in shape and made of hard vinyl chloride, having maximum internal diameter of 30 cm. and flange 31 at its upper end. The peripheral portion of the plate 620 is securely held between the lower flange 612 of the vessel 610 and the flange 631 of the air chamber through rubber gaskets 622, and the two flanges are coupled together by means of bolts and nuts 613 at several positions, as shown at FIG. 6B. With this device, it will be seen that (Cross sectional area of the cylindrical vessel)/(Area of the multi-perforated plate)=1
Tapered angle $\theta=0$
(Height of the vessel)/(Diameter of the plate)—6.6

It will be seen further that the top cover 614 made of stainless steel is coupled to the upper flange 611 of the vessel 610 by means of bolts and nuts (both unillustrated) and that through the top cover 614 the following three pipes penetrate into the reaction vessel: Steam injection pipe 615, 2.4 cm. in internal diameter and made of stainless steel, coming down approximately 150 cm. from the top cover; raw powder or solution inlet pipe 616, 4.9 cm. in internal diameter and made of stainless steel, coming down 15 cm. from the top cover and provided with a cover 617 that can be opened or closed as required; and air exhaust pipe 618, 4.9 cm. in internal diameter and made also of stainless steel, coming down 20 cm. from the top cover.

A cyclone separator 641 made of hard vinyl chloride is installed in the exhaust pipe 618 for preventing impure air from entering the vessel 610. In the side wall of the vessel a thermometer (unillustrated) is inserted, while solution discharge valve 619 made of iron and coated with polyethylene and Teflon is installed at an elevation 1.5 cm. from the vessel bottom. A multi-perforated buffer plate 632 is provided in the air chamber 630 and an air inlet pipe 633, 3.7 cm. in internal diameter, is connected to the air chamber as illustrated. This device is installed in a plumb position with the aid of supporting members (unillustrated).

The oxidizing gas (air in this embodiment) delivery system associated with the device 600 consists of the following:

Air compressor 642; compressed air outlet 651 connected thereto; air flow control valve 652, one way of which being connected to surplus air outlet 653 and the other connected to air filtering device 643; said air filtering device 643 in which filtering materials such as stainless steel in mesh form, glass fibres and fragments, etc.

are filled for removal of grease particles and dust from the intake air and equipped with pressure gauge 644; water washing device 645 for further purification of the air and equipped with pressure gauge 646; check valve 656 in pipe line 655; air flow meter 647; check valve 658, air inlet pipe 633 connected to the air chamber, etc.

With this equipment (shown in FIG. 6A), the aforementioned first method for causing precipitation of particles containing the $Fe^{3+}$ ions was carried out. In the first place, air was blown into the air chamber at the rate of 150 liters per minute through air inlet 633 by regulating the air flow regulating valve 652. Aided by the buffer plate 632, the air was blown uniformly into the vessel 610 through perforations in the multi-perforated plate 620. Under this condition, 90 liters of 0.15 $M \cdot H_2SO_4$ of high purity were poured into the vessel 610 from the raw material inlet 616. The intrusion of the liquid into the air chamber through perforations 621 did not substantially occur in this case. This was followed by an increase in the air flow amount to 200 liters per minute and the addition of 3.5 kg. of electrolytic iron stamped powder (smaller than 140 microns in diameter) of high purity into the diluted $H_2SO_4$ solution from the inlet 616. Although, part of iron powder was dissolved into the solution to produce a small amount of hydrogen gas, it was expelled together with air from the exhaust pipe 618. Then, steam was blown into the solution from pipe 615 to maintain temperature of the solution at 70° C. Under this condition, the solution was subjected to effervescent action by high-purity air rising at the rate of 190 liters per minute for 8 hours. It was found then that all the iron particles in uniform suspension in the solution was converted to a precipitate of non-ferromagnetic particles.

After the oxidation process was over, valve 619 was opened with air kept blown into the solution to take out a solution containing a yellowish brown precipitate. The precipitate was then separated in a centrifugal separator, filtered, and washed in water to obtain a muddy substance in yellowish brown color. This substance was dried at 150° C. for 8 hours to obtain approximately 4.5 kg. of yellowish brown powder. The present inventors confirmed that the powder consisted of $\alpha$—$FeO \cdot OH$ particles, 1–2 microns in length and 0.3–0.6 micron in width, the tapping density of the powder being 0.97 and $Fe_2O_3$ content being 88.67 wt. percent. Each of Si, As, Pb, alkali metal, and alkaline earth metal ion contents was less than 0.01 wt. percent. This high-purity ferric oxyhydrate powder was excellent as a material of ferrite cores for use in communication apparatus.

Embodiment 2

The effervescent mixing and oxidizing device 700 according to another embodiment of this invention shown in FIG. 7 is composed mainly of the following sections:

Cylindrical reaction vessel 710, 150 cm. in height and 30 cm. in internal diameter; hollow, inverted cone frustum section 711, 30 cm. in maximum diameter, 8 cm. in minimum diameter, and 10 degrees in tapered angle ($\theta$); cylindrical neck section 712, 10 cm. in height and 8 cm. in internal diameter; multi-perforated plate 720 located beneath the neck section, 7 mm. in thickness, with uniformly distributed perforations 721, 2 mm. in diameter and 1 cm. in interval between centers, over its effective surface area; and cylindrical air chamber 730 located beneath the plate 720, 8 cm. in internal diameter and 10 cm. in height.

It will be seen from these numerical data that with this device 700, (Cross sectional area of the vessel 710)/(Area of multi-perforated plate 720)=approx. 14;
Tapered angle $\theta$=10 degrees; and
[Overall height (710+711+712]/Diameter of multi-perforated plate)=27.7

Flange 713 at the lower end of the neck section 712 and flange 731 at the upper end of the air chamber 730 are coupled together by means of bolts and nuts (unillustrated) with the multi-perforated plate 720 sandwiched therebetween through rubber gaskets (unillustrated). The open end of the reaction vessel 710 is covered with cover 717 through which air exhaust pipe 714, steam injection pipe 715, raw material inlet pipe (unillustrated), and a pipe-protected thermometer 716 penetrate. A three-way valve 740 is connected in a pipeline coming down from the cone section 732 at the lower end of the air chamber 730. To the three-way valve are connected air inlet 733 and product outlet 741. It will be understood that a similar oxidizing gas delivery system as in the embodiment 1 is connected to the air inlet 733. Incidentally, the interior of any one of the sections 710, 711, and 712 (made of iron) of this device is lined with polyethylene, the multiperforated plate 720 is made of hard vinyl chloride, and any one of parts 714, 715, 716, 717, 730, 732, 733, and 741 is made of stainless steel.

In this embodiment, the previously mentioned first method was performed with the device 700 shown in FIG. 7. First, highly purified air was blown into the vessel from the bottom through small holes 721 perforated in the plate 720 at the rate of 50 liters per minute and at the same time, 70 liters of 0.15 $M \cdot H_2SO_4$ of high purity were poured into the vessel from the raw material inlet. It was noted that this aqueous solution could scarcely fall into the air chamber under this condition.

Secondly, 1.5 kg. of electrolytic iron powder of high purity (smaller than 140 microns in diameter) was poured into the vessel from the raw material inlet with air kept blown into the solution at the rate of 80 l./m. Part of the iron powder was found to have been dissolved into the solution to produce a small amount of hydrogen gas. This hydrogen gas was exhausted from the exhaust pipe 714 together with air passed through the solution.

This was followed by a process of blowing steam into the solution through pipe 715 to maintain temperature of the solution at 70° C. and by a subsequent process of subjecting the solution to effervescent action by blowing purified air into the air chamber at the rate of 90 l./m. for 7.5 hours to convert all the iron particles suspended in the solution to a precipitate of non-ferromagnetic particles. At the termination of these processes, the three-way valve 740 was operated to stop air flow through pipe 733 and the solution which had been thoroughly oxidized was discharged from the outlet 741.

The yellowish brown precipitate was separated in a centrifugal separator, filtered, and washed in water to obtain a yellowish brown muddy substance. This substance was dried at 150° C. for 8 hours to obtain approximately 2 kg. of yellowish brown powder. The powder consisted of $\alpha$—$FeO \cdot OH$ particles of sizes ranging between 2–3 microns in length and 0.5–0.8 micron in width, had the tapping density of 1.12 and the $Fe_2O_3$ content of 88.79 wt. percent. The content of each of the impurities (Si, As, Pb, alkali metal, and alkaline earth metal ions) in the powder was less than 0.01 wt. percent. This ferric oxyhydrate powder was excellent as a ferrite material for use in communication apparatus.

Embodiment 3

In this embodiment, the device 700 as illustrated in FIG. 7 was used. With air blown into the vessel at the rate of 50 l./m. from the bottom through the perforated plate 720, 60 liters of 0.25 $M \cdot CH_3COOH$ of high purity were poured from the raw material inlet. Then, with the air blowing rate increased to 80 l./m., 2.0 kg. of electrolytic iron stamped powder of high purity (less than 140 microns in diameter) were added to the solution through the raw material inlet. A vehement foaming occurred in this case by reaction between iron powder and acetic acid and injection of highly purified air from the top of the vessel to the surface of solution for vanishing foams was found to be necessary at times. Then, steam was blown into the solution through pipe 715 to maintain temperature of the solution at 50° C. With this temperature kept constant, the solution was subjected to effervescent action for 7 hours by highly purified air delivered through pipe 733 at the rate of 90 l./m. It was proven that all the iron particles that had been in suspension in the solution was converted to a precipitate of non-ferromagnetic particles. The three-way valve 740 was then operated to stop air flow and the solution containing the yellowish red precipitate was discharged from the outlet 741.

The precipitate was separated in a centrifugal separator, filtered and washed in water to obtain a yellowish red, muddy substance. The muddy substance was then dried at 150° C. for 8 hours to obtain 3 kg. of orangish brown powder. This powder consisted of $\gamma$—$FeO \cdot OH$ particles of sizes ranging 1–2 microns in length and 0.5–1.0 micron in width, had the tapping density of 1.05, full of dryness and fluidity, and the $Fe_2O_3$ content of 88.81%. In the powder, the presence of As, Pb, and alkali metal ions could scarcely be detected and the content of $SiO_2$ was less than 0.01 wt. percent.

Embodiment 4

The effervescent mixing and oxidizing device 800 used in this embodiment mainly consists, as shown at FIGS. 8A and B, of cylindrical vessel 810, 30 cm. in internal diameter and 150 cm. in height; hollow inverted cone frustum section 811, 30 cm. in maximum diameter, 5 cm. in minimum diameter, 10 degrees in tapered angle ($\theta$), and approximately 79 cm. in height; cylindrical neck section 812, 5 cm. in internal diameter and 3 cm. in height; multi-perforated plate 820 1 mm. in thickness, through which a number of uniformly distributed holes 821, 2 mm. in diameter and 1 cm. in interval between centers, penetrate; and air chamber 830 of cup shape, 5 cm. in internal diameter and 5 cm. in height. Any one of these parts is made of stainless steel. Flange 813 at the lower end of the neck section 812 and flange 831 at the upper end of air chamber 830 are coupled together so as to sandwich the multi-perforated plate 820 therebetween through gaskets (unillustrated). The dimensional proportions of this device 800 are as follows:

(Cross sectional area of vessel 810)/(Area of multi-perforated plate 820)=36;
Tapered angle $\theta$=10 degrees; and
(Overall device height 810+811+812)/(Diameter of multi-perforated plate)=79 approx.

Air exhaust pipe 814, steam injection pipe 815, and raw material inlet (unillustrated) are connected to the cover 817 of the vessel 810, while valve 818 for discharging the solution containing the product is installed on the side wall of the neck section 812. Air inlet 833 connected to the bottom of air chamber 830, pipe 851 to be connected to a highly purified air delivery system (unillustrated), and pipe 852 to be connected to a highly purified nitrogen gas supply source (unillustrated) are coupled together by three-way valve 850. Inside the air chamber, there is provided buffer plate 834 for applying a uniform pressure of a gas from pipe 833 on the lower effective surface (5 cm. in diameter) of the multi-perforated plate 820.

In this embodiment, ferrite powder was manufactured by the previously mentioned third method with the device 800 shown in FIG. 8.

In the first place, 6.0 kg. of crystalline $FeSO_4 \cdot 7H_2O$ and 2.0 kg. of crystalline $ZnSO_4 \cdot 7H_2O$ of high purity were dissolved in 60 liters of 0.1 N·$H_2SO_4$. Further, $NH_4OH$ in amounts corresponding to 1.2 molar equivalents of $SO_4^{2-}$ existing in the sulphate solution was added to the solution, thereby to prepare a solution having a pH value of 9.5 and containing a whitish green non-ferromagnetic precipitate. This solution was then diluted to 70 liters.

On the other hand, nitrogen gas was blown into air chamber 830 through pipe 852 by operating three-way valve 850 so that the gas may be delivered into the vessel at the rate of 20 liters per minute through perforations 821. Under this condition, 70 liters of the preliminarily prepared solution were fed into the vessel from the raw material inlet. Then, steam was blown into the solution through the steam injection pipe 815 to heat the solution to 65° C. The solution maintained at 65° C. was subjected to effervescent action for 8 hours by air containing 0.5% by volume of $NH_3$ and rising at the rate of 20 liters per minute through pipe 851. A suspension containing a brownish black precipitate of ferromagnetic particles formed as a result of oxidation was taken out of the outlet valve 818.

This suspension having the pH value of 8.2 was filtered with a centrifugal separator. The precipitate obtained was washed in water, and then water contained therein was removed as much as possible by washing with acetone. As a result of subjecting the product to a drying process at a temperature lower than 50° C., 2.3 kg. of zinc ferrite powder consisting of $Zn_{0.73}Fe_{2.27}O_{4+\Delta x}$ particles (solid solution of $Fe_{3-x}O_4$ and 3 moles $ZnFe_2O_4$) having the isotropic shape and size of 0.1 to 0.2 micron were obtained.

On heating the powder at 400° C. in air, dark brown powder consisting of $Fe_{1-x}Zn_{2+x}O_{4+0.5x}$ (solid solution of 1 mole of $\gamma$—$Fe_2O_3$ and 3 moles of $ZnFe_2O_4$) particles was obtained, whereas on heating at 550° C. in air bright reddish brown powder (uniform mixture of $ZnFe_2O_4$ and $\alpha$—$Fe_2O_3$) was obtained. Any one of the powders contained less than 0.001% of arsenic (As) or lead (Pb) harmful to the human skin and proved to be excellent as a pigment or an ultraviolet radiation absorbent for high-class cosmetics.

Embodiment 5

Ferrite powder was manufactured by the previously mentioned third method with the device 800 shown in FIG. 8. At first, 7,200 grams of $FeSO_4 \cdot 7H_2O$, 1,260.3 grams of $MnSO_4 \cdot H_2O$, and 1,200.1 grams of $ZnSO_4 \cdot 7H_2O$, each of high purity, were dissolved into 30 liters of 0.01 N—$H_2SO_4$ to produce an acid solution containing $Fe^{2+}$, $Mn^{2+}$, and $Zn^{2+}$ in the atomic number ratio of 10.6:3.0:1.7. Then 3,400 g. of NaOH were added to this acid solution and the solution was diluted to 70 liters. This solution contained a whitish blue precipitate of non-ferromagnetic particles of $CdI_2$ type crystal structure and had a pH value in excess of 11.

With nitrogen gas kept blown at the rate of 20 l./m. into the vessel through the multi-perforated plate 820, the solution that had been prepared so as to have a pH value of more than 11 was fed into the vessel. Then, steam was blown into the solution through pipe 815 to maintain the temperature of the solution at 70° C. Upon the temperature reaching 70° C., the supply of nitrogen gas was switched to that of air blown at the rate of 20 liters per minute, whereby the solution maintained at 70° C. was subjected to an effervescent and oxidizing process for 22 hours by air delivered at the rate of 20 l./m.

At the conclusion of oxidation, the solution was taken from the outlet 818 to find that a black precipitate of ferromagnetic particles was formed. The precipitate was filtered out, washed with diluted ammonium oxalate solution, then washed in water, and water contained therein was removed as much as possible by acetone. This precipitate was dried at a temperature below 50° C. to obtain 2,700 grams of black powder. This powder was proved to consist of Mn-Zn ferrite particles of cubic shape, 0.17 micron in diameter, containing Fe, Mn, and Zn in the atomic number ratio of 10.6:3.0:1.7. The content of Na ions was less than 0.01% by weight. This ferrite powder was excellent as a ferromagnetic material for use in communication apparatus. For instance, ferrite cores obtained by pressure-molding this powder to a suitable shape and then subjecting to a sintering process at 1,200° C. in a nitrogen atmosphere had a tan $\delta/\mu_0$ value at 100 kHz. of less than $2\times10^{-6}$.

Embodiments 6 through 9

High purity FeO·OH powder (see embodiments 6 and 7 in Table 1) for use as a ferrite material for carrier equipment and FeO·OH powder for pigments (see embodiments 8 and 9) were manufactured by the previously mentioned first method with the device according to this invention. Reference to Table 1 reveals dimensions of principal parts of the device, materials used for these parts (see caption "Device"), compositions of mother solutions, conditions under which oxidation took place (see caption "Reaction"), characteristics of powders obtained by drying precipitates formed in the solutions (see caption "Powdered Product"), pertinent data. In the caption "Device," FIG. 3 or FIG. 5 is referred to.

Embodiments 10 through 14

Ferric oxide powder was manufactured by the previously mentioned second method in embodiments 10 and 11, while ferrite powder was manufactured by the previously mentioned third method in embodiments 12 through 14. An outline of these embodiments is shown in Table 2. Note that caption details have been omitted in the extreme left-hand column in Table 2 and same numerals as used in Table 1 substituted therefor.

TABLE 1

| | Embodiment 6 | Embodiment 7 | Embodiment 8 | Embodiment 9 |
|---|---|---|---|---|
| I.—"Device" | | | | |
| Dimensions: | | | | |
| (1) Internal dia. of main reaction vessel 31. | 30 cm. | 80 cm. | 30 cm. | 30 cm. |
| (2) Height of same. | 400 cm. | 300 cm. | 150 cm. | 150 cm. |
| (3) Height of inverted cone frustum 41. | 0 cm. | Approx. 85 cm. | Approx. 47 cm. | 47 cm. |
| (4) Internal dia. of neck section 51. | | 50 cm. | 5 cm. | 5 cm. |
| (5) Height of neck section 51. | 0 cm. | 100 cm. | 50 cm. | 50 cm. |
| (6) Tapered angle $\theta$ of 41. | 0°. | 10°. | 15°. | 15°. |
| (7) Thickness of multi-perforated plate 33: | | | | |
| (a) | 0.4 cm. | } 0.8 cm. | 0.2 cm. | 0.2 cm. |
| (b) | 0.8 cm. | | | |
| (8) Diameter of holes in plate 33. | 0.5–0.3 cm. | 0.3–0.2 cm. | 0.2 cm. | 0.15 cm. |
| (9) Spacing between centers of two adjacent holes. | 3.0–2.0 cm. | 2.5–1.5 cm. | 1.0 cm. | 1.0 cm. |
| II.—Materials: | | | | |
| (10) Cover of vessel 3 and its accessories. | Stainless steel. | Iron sheet lined with polyethylene. | Hard vinyl chloride. | Stainless steel. |
| (11) Reaction vessel sections 31, 41 and 51. | Hard vinyl chloride. | do. | Iron sheet lined with polyethylene. | Hard vinyl chloride. |
| (12) Multi-perforated plate 33. | (a) Iron sheet lined with phenol resin; (b) hard vinyl chloride. | Hard vinyl chloride. | Stainless steel. | Stainless steel. |
| (13) Air chamber 34. | Iron sheet lined with phenol resin. | Iron sheet lined with polyethylene. | do. | Stainless steel. |
| "Reaction" | | | | |
| (14) Kinds and quantities of substances of which solution is composed. | 6.5 kg. of electrolytic iron powder (smaller than 140$\mu$), 7.0 kg. of ferrous sulphate, 170 liters of water. | 70 kg. of electrolytic iron powder (size less than 140$\mu$), 10 liters of 98% $H_2SO_4$, 1,500 liters of water. | 1.5 kg. of iron powder (size less than 140$\mu$), 2.0 kg. of ferrous chloride, 0.2 kg. of NaOH, 90 liters of water. | 1.5 kg. of iron powder, 3.5 kg. of ferrous sulphate, 0.4 kg. of NaOH, 90 liters of water. |
| (15) Reaction temperature. | 65° C. | 65° C. | 10° C.–50° C. | 40° C.–60° C. |
| (16) Air supply amount. | 250 l./m. | 700 l./m. | 90 l./m. | 90 l./m. |
| (17) Air supply time interval. | 8 hours. | 8 hours. | 4 hours–9 hours. | 5 hours–9 hours. |
| "Powdered product" | | | | |
| (18) Yield. | Approx. 10 kg. | Approx. 90 kg. | Approx. 2.5 kg. | Approx. 2.5 kg. |
| (19) Color. | Brownish yellow. | Brownish yellow. | Orange yellow. | Yellow. |
| (20) Magnetic properties. | Non-ferromagnetic. | Non-ferromagnetic. | Non-ferromagnetic. | Non-ferromagnetic. |
| (21) Chemical composition. | $Fe_2O_3$ 87.66%, $SO_3$ 0.03%, $H_2O$ 12.31%. | $Fe_2O_3$ 88.12%, $SO_3$ 0.04%, $H_2O$ 11.84%. | $Fe_2O_3$ 86.25%, chlorides 0.21%, $H_2O$ 13.54%. | $Fe_2O_3$ 86.05%, $SO_3$ 0.15%, $H_2O$ 13.80%. |
| (22) Tapping density. | 0.92. | 1.05. | 0.32. | 0.31. |
| (23) Particle size. | 1–3$\mu$ x 0.4–0.6$\mu$. | 1–3$\mu$ x 0.4–0.8$\mu$. | 1–4$\mu$ x 0.2–0.3$\mu$. | 1–2$\mu$ x 0.2–0.3$\mu$. |
| (24) Kind of particles. | $\alpha$-FeO·OH. | $\alpha$-FeO·OH. | $\gamma$-FeO·OH. | $\alpha$FeO·OH. |

TABLE 2

| | Embodiment 10 | Embodiment 11 | Embodiment 12 | Embodiment 13 | Embodiment 14 |
|---|---|---|---|---|---|
| I.—"Device" | | | | | |
| (1) | 30 cm. | 30 cm. | 30 cm. | | 50 cm. |
| (2) | 150 cm. | 400 cm. | 400 cm. | 400 cm. | 200 cm. |
| (3) | Approx. 47 cm. | Approx. 47 cm. | 0. | 0. | Approx. 43 cm. |
| (4) | 5 cm. | 5 cm. | | | 10 cm. |
| (5) | 50 cm. | 50 cm. | 0. | 0. | 20 cm. |
| (6) | 15°. | 15°. | 0°. | 0°. | 25°. |
| (7) | 0.3 cm. | 0.4 cm. | 0.55 cm. | 0.55 cm. | 0.4 cm. |
| (8) | 0.2 cm. | 0.2 cm. | 0.3–0.2 cm. | 0.3–0.2 cm. | 0.2 cm. |
| (9) | 1.0 cm. | 1.0 cm. | 2.0–1.0 cm. | 2.0–1.0 cm. | 1.5 cm. |
| (10) | Stainless steel. | Stainless steel. | Stainless steel. | Stainless steel. | Stainless steel. |
| (11) | do. | Hard vinyl chloride. | Hard vinyl chloride. | Hard vinyl chloride. | Iron sheet lined with polyethylene. |
| (12) | do. | Iron sheet lined with phenol resin. | Iron sheet lined with phenol resin. | Iron sheet lined with phenol resin. | Stainless steel. |
| (13) | do. | do. | do. | do. | Polyethylene lined with iron sheet. |
| "Reaction" | | | | | |
| 14 | 12 kg. of ferrous sulphate, 2 kg. of $NH_3$, 90 liters of water. | 24 kg. of ferrous sulphate, 4.6 kg. of Mg(OH)$_2$, 170 liters of water. | 10 kg. of ferrous sulphate, 1 kg. of cobalt sulphate, 3.4 kg. of NaOH, 170 liters of water. | 21.6 kg. of ferrous sulphate, 3.8 kg. of manganese sulphate, 3.5 kg. of $ZnSO_4$, 10.1 kg. of NaOH, 170 liters of water. | 47.5 kg. of ferrous sulphate, 8.4 kg. of manganese sulphate, 7.7 kg. of zinc sulphate, 22.2 kg. of NaOH, 370 liters of water. |
| (15) | 60° C. | 70° C. | 70° C. | 70° C. | 70° C. |
| (16) | 25 l./m. | 300 l./m. | 300 l./m. | 200 l./m. | 110 l./m. |
| (17) | 10 hours. | 5 hours. | 5 hours. | 10 hours. | 28 hours. |

TABLE 2—Continued

| | Embodiment 10 | Embodiment 11 | Embodiment 12 | Embodiment 13 | Embodiment 14 |
|---|---|---|---|---|---|
| "Produced powder" | | | | | |
| (18) | Approx. 3.2 kg | Approx. 6 kg | Approx. 6 kg | Approx. 8.5 kg | Approx. 19 kg. |
| (19) | Black | Brownish black | Black | Black | Black. |
| (20) | Ferromagnetic | Ferromagnetic | Ferromagnetic | Ferromagnetic | Ferromagnetic. |
| (21) | $Fe_2O_3$ 98.8%, $SO_3$ 0.7%, $H_2O$ 0.5%. | $Fe_2O_3$ 98.7%, 1MgO 0.1%, $SO_3$ 0.3%, $H_2O$ 0.9%. | Fe:Co=10:1 (At. No. ratio) $SO_3$ 0.01%, $H_2O$ 0.02%. | Fe:Mn:Zn=10.6:3.0:1.7 (At. No. ratio) $SO_3$ 0.01%, $H_2O$ 0.05%. | Fe:Mn:Zn=10.6:3.0:1.7 (At. No. ratio) $SO_3$ 0.01% or less, $H_2O$ 0%. |
| (22) | 0.95 | 0.92 | 0.97 | | 1.07. |
| (23) | 0.11μ | 0.12μ | 0.13μ | 0.07μ | 0.21μ. |
| (24) | $Fe_3O_4$ | $Fe_3O_4$ | $Co_{0.1}Fe_{2.9}O_4$ | MnZn ferrite | MnZn ferrite. |

As will be evident from the foregoing description, it is possible with the device according to this invention to subject solutions to a uniform effervescent and oxidation process, with the result that size, crystal structure, and chemical composition of precipitated particles can be controlled by suitably determining the conditions for oxidation of solutions such as the solution heating temperature, the amount of an oxidizing gas to be passed into the solution, the duration of the oxidation, and the kinds of quantities of substances of which the solution is composed.

While the present invention has been particularly illustrated and described with reference to several preferred embodiments thereof, it will be understood by those skilled in the art that various changes in form and details may be made without departing from the spirit and scope of the invention as stated in the following claims.

What is claimed is:

1. A method of producing an iron-containing precipitate with iron in the ferric state which comprises,
    establishing and confining a column of an aqueous solution above a multi-perforated plate of predetermined area, said solution being capable of dissolving a suspension of iron-containing particles selected from the group consisting of iron powder and precipitated ferrous hydrate having a $CdI_2$ type or $CdCl_2$ type crystal structure whereby to form hydroxoferrous complex ions,
        the ratio of the cross-sectional area of the column of the solution to the area of the multi-perforated plate ranging from about 1:1 to 400:1, the perforations of the plate having a diameter ranging from about 1 to 6 mm. spaced between centers thereof by about 0.5 to 5 cm., with the height of said column at least about 5 times the diameter of said plate,
        said solution and suspension being maintained above said plate by a flow of gas through said plate from a gas chamber located below said plate,
    and maintaining a flow of oxidizing gas from said gas chamber through said multi-perforated plate to effect uniform mixing of the gas and the solution whereby to produce an iron hydrate with the iron thereof in the ferric state.

2. The method of claim 1, wherein the column of aqueous solution is estaiblished as an acidic aqueous solution containing a suspension of fine iron particles with the ratio of the cross sectional area of the column of solution above the plate to the area of the said plate ranging from about 1:1 to 36:1, the lower portion of the column of solution extending to the plate being tapered at an angle of up to about 15°, the flow of oxidizing gas through said plate being continued until said iron particles are converted to a precipitate comprising oxyferrihydrates.

3. The method of claim 2 comprising controlling the flow of oxidizing gas to the solution at a rate of at least about 0.2 liter per square centimeter per minute.

4. A method of producing ferrities which comprises,
    establishing and confining a column of an aqueous alkaline solution above a multi-perforated plate of predetermined area, said solution having a suspension comprising a precipitate of ferrous hydroxide and at least one other ferrite-forming divalent metal hydroxide,
        the ratio of the cross-sectional area of the column of the solution to the area of the multi-perforated plate ranging from about 1:1 to 400:1, the perforations of the plate having a diameter ranging from about 1 to 6 mm. spaced between centers thereof by about 0.5 to 5 cm., with the height of said column at least about 5 times the diameter of said plate,
        said solution and suspension being maintained above said plate by a flow of gas through said plate from a gas chamber located below said plate,
    and maintaining a flow of oxidizing gas from said gas chamber through said multi-perforated plate to effect uniform mixing of the gas and the solution whereby to convert the hydroxide suspension to a precipitate of spinel-type ferrite particles.

5. The method of claim 4, wherein the cross section of the column of solution is 36 to 64 times the area of said multiperforated plate, and wherein the lower portion of said column of solution is tapered towards said plate at an angle of about 10 to 25°.

6. The method of claim 5, wherein the oxidizing gas supplied to said solution also has included with it ammonia gas.

References Cited

UNITED STATES PATENTS

| 2,431,455 | 11/1947 | Blanding. | |
| 1,958,383 | 5/1934 | Naucler et al. | |

FOREIGN PATENTS

| 749,876 | 1/1967 | Canada | 23—51 R |
| 1,467,641 | 12/1966 | France | 23—51 R |

HERBERT T. CARTER, Primary Examiner

U.S. Cl. X.R.

423—632, 633, 634; 252—62.56; 23—260, 285